United States Patent
Hammond

(10) Patent No.: US 6,556,220 B1
(45) Date of Patent: Apr. 29, 2003

(54) METHOD AND SYSTEM TO DISPLAY, MODIFY OR SUBSTITUTE THE CONTENTS OF SELF-DESCRIBING OBJECTS

(75) Inventor: Barton Wade Hammond, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/422,363

(22) Filed: Oct. 21, 1999

(51) Int. Cl.[7] ................................................ G09G 5/00
(52) U.S. Cl. ...................... 345/764; 345/765; 345/733; 345/744
(58) Field of Search ............................... 709/202, 246; 707/103; 717/1; 345/335, 329, 326, 744, 733, 700, 764, 765

(56) References Cited

U.S. PATENT DOCUMENTS

| | | | |
|---|---|---|---|
| 5,727,175 A | 3/1998 | Malone et al. | 395/356 |
| 5,734,905 A | 3/1998 | Oppenheim | 395/683 |
| 5,900,870 A | 5/1999 | Malone et al. | 345/333 |
| 6,049,819 A * | 4/2000 | Buckle et al. | 709/202 |
| 6,078,322 A * | 6/2000 | Simonoff et al. | 345/335 |
| 6,249,803 B1 * | 6/2001 | Jindal et al. | 709/203 |
| 6,317,795 B1 * | 11/2001 | Malkin et al. | 709/246 |
| 6,330,659 B1 * | 12/2001 | Poff et al. | 712/34 |
| 6,330,709 B1 * | 12/2001 | Johnson et al. | 717/1 |
| 6,332,210 B1 * | 12/2001 | Barkataki et al. | 717/4 |

* cited by examiner

Primary Examiner—Kristine Kincaid
Assistant Examiner—Mylinh Tran
(74) Attorney, Agent, or Firm—Duke W. Yee; David A. Mims, Jr.; Lisa L. B. Yociss

(57) ABSTRACT

A method and system to decompose, display, modify and substitute the contents of self-describing objects is presented. A user-friendly graphical user interface is designed to facilitate the processing of these objects. Since objects can be arbitrarily complex, the presentation of information in a clear and concise manner is critically important. The user can modify the values for existing objects, and by using the copy and paste operations, the user can construct new objects. These changes are made through the graphical user interface where the contents of the object is displayed and controls are provided to modify existing objects or to create new objects. The particular embodiment deals with CORBA objects of type ANY. Objects of ANY type include a Helper class to support the insertion and extraction of information. This class is dynamically created and invoked to assist in obtaining the contents from the ANY type. There are also methods to help narrow the type of objects. By utilizing these self-describing features, the present embodiment allows a user to decompose, display, and modify CORBA objects of type ANY, and to construct new objects of CORBA type ANY.

4 Claims, 15 Drawing Sheets

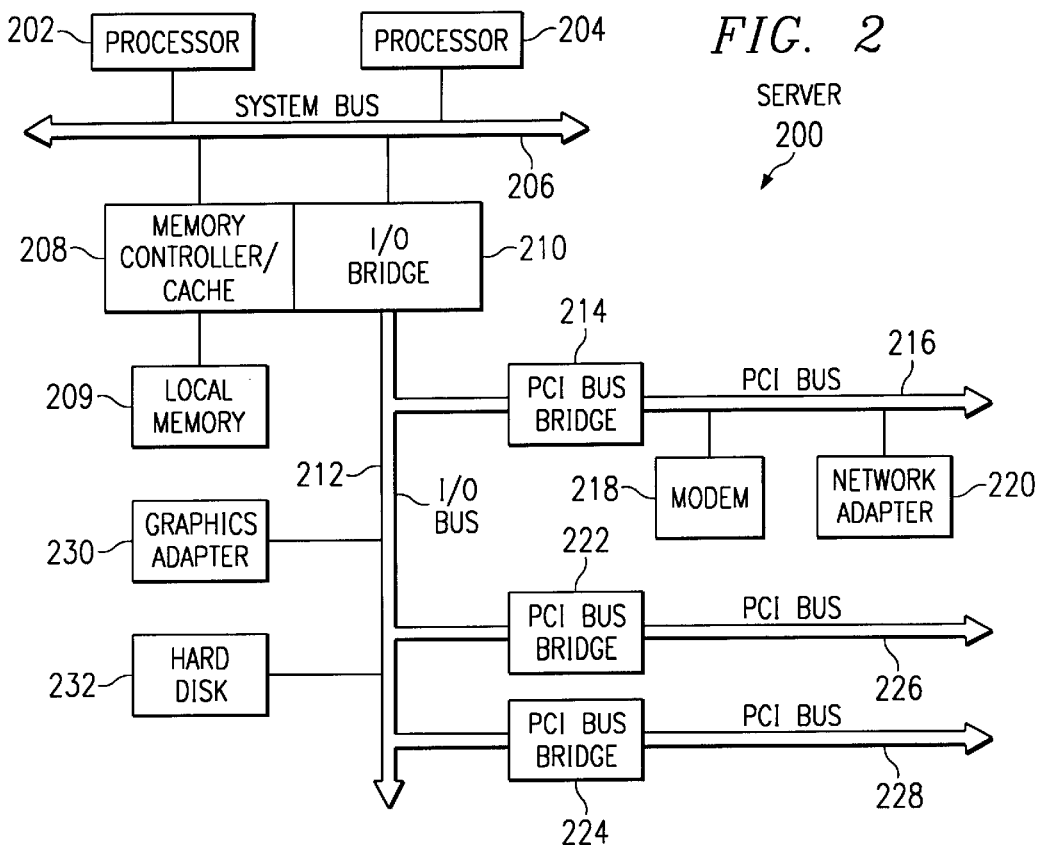

FIG. 2

SERVER 200

FIG. 10
JAVA CODE TO EXTRACT
DATA FROM TYPE ANY

```
public void set(org.omg.CORBA.Any inAny) {
    removeAll();

org.omg.CORBA.TCKind tckind;
    any = inAny;
    tckind = inAny.type().kind();
    try {
        if (tckind == org.omg.CORBA.TCKind.tk_null) {
            component = new QTTextField(beanName,textField,"string",qtAnyEditor);
            qtAnyEditor.set("string");
            add(component);
        } else if (tckind == org.omg.CORBA.TCKind.tk_long) {
            component = new QTTextField(beanName,textField,"long",qtAnyEditor);
            ((QTTextField)component).setText(Integer.toString(inAny.extract_long()));
            qtAnyEditor.set("long");
            add(component);                 --
        ..............
        } else if (tckind == org.omg.CORBA.TCKind.tk_alias) {
            component = extractAlias(inAny.type().id(), inAny, qtAnyEditor);
            qtAnyEditor.set("object");
            add(component);
        } else {
```

TYPE OPTIONS FOR anAny

TYPE CHANGED TO BOOLEAN

COPY AN OBJECT
TO THE CLIPBOARD

PASTE AN OBJECT FROM THE CLIPBOARD

USER INPUT AFTER PASTE

```
protected JComponent extractAlias(String className, org.omg.CORBA.Any inAny, QTAnyEditor qtAnyEditor )
        CopyPaste copyPaste = null;
        Class aClassHelper = null;
        Class[] parms = null;
        Object obj = null;
        try {
                className = className.substring(4);
                className = className.substring(0,className.length()-4);
                className = className.replace('/','.');

aClassHelper = Class.forName(className+"Helper");
                Method[] methods = aClassHelper.getDeclaredMethods();
                for (int i = 0; i< methods.length;i++) {
                        if (methods[i].getName().equals("extract")) {
                                parms = methods[i].getParameterTypes();
                                break;
                        }
                }

Method m = aClassHelper.getDeclaredMethod("extract",
                                                        parms);
                Object[] args = new Object[1];
                args[0] = inAny;
                if (m != null) {
                        obj = m.invoke(aClassHelper,
                                        args);
                        copyPaste = new CopyPaste ("cp",
                                        new Pasteable() {
                                                public boolean canPaste(Object obj) {
                                                        return true;
                                                }
                                        },className,
                                        qtAnyEditor);
                        copyPaste.setObject(obj);
                }
        } catch (Exception c) {
                Util.processException(Messages.getMsg("AnyExtractAliasFailed"),c);
        }
        return copyPaste;
}
```

EXTRACT OF ALIAS

*FIG. 12*

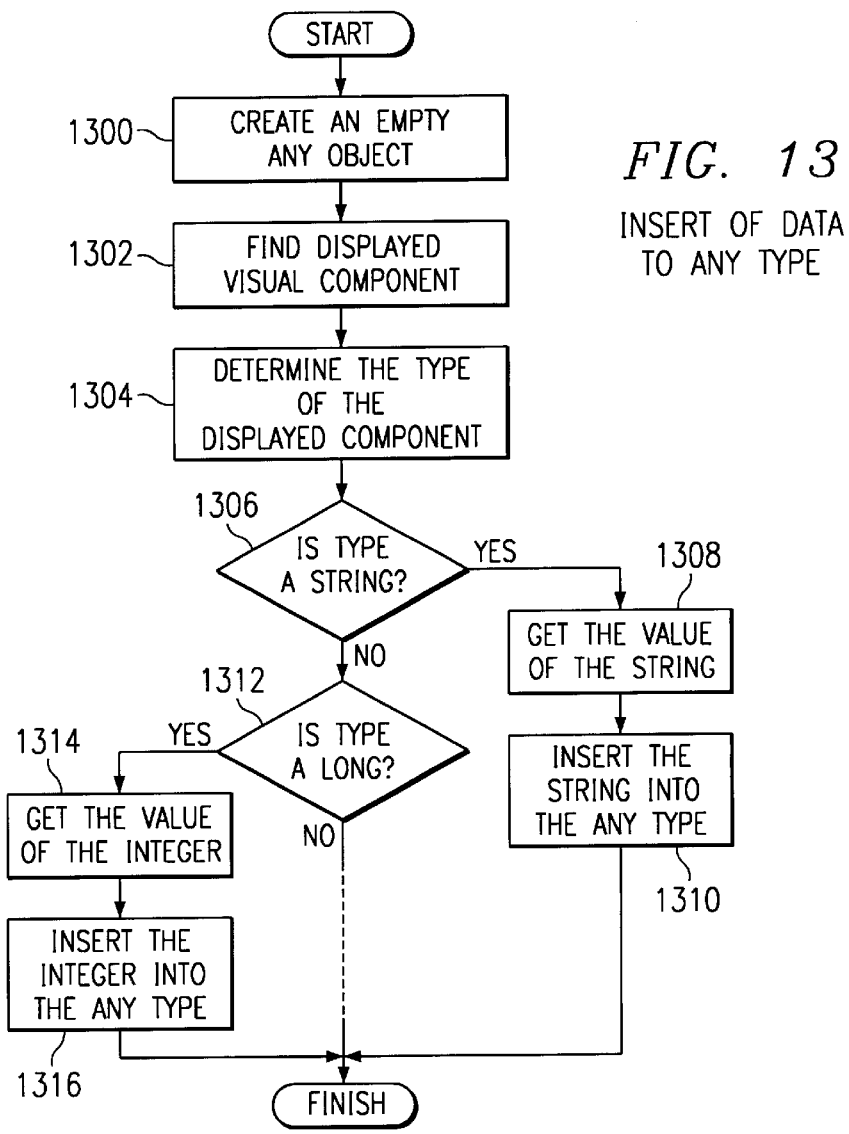

FIG. 13

INSERT OF DATA TO ANY TYPE

```
public org.omg.CORBA.Any any() {
    any = com.ibm.CBCUtil.CBSeriesGlobal.orb().create_any();
    if (component instanceof QTTextField) {
        QTTextField qtTextField = (QTTextField) component;
        type = qtTextField.type();
        if (type.equals("string")) {
            any.insert_string(qtTextField.getText());
        } else if (type.equals("long")) {
            any.insert_long(Integer.valueOf(qtTextField.getText()).intValue());
        ....
```

INSERT OF DATA INTO ANY

FIG. 14

```
if (component instanceof CopyPaste) {
        CopyPaste copyPaste = (CopyPaste) component;
        String className = copyPaste.getText();
        className = className.substring(0,className.length()-1);

Class aClassHelper = null;
        Class[] parms = null;
        try {
                aClassHelper = Class.forName(className+"Helper");
                Method[] methods = aClassHelper.getDeclaredMethods();
                for (int i = 0; i< methods.length;i++) {
                        if (methods[i].getName().equals("insert")) {
                                parms = methods[i].getParameterTypes();
                                break;
                        }
                }
                Method m = aClassHelper.getDeclaredMethod("insert",
                                                        parms);
                Object[] args = new Object[2];
                args[0] = any;
                args[1] = copyPaste.getObject(); //may over write this //A sequence of stuff works fine but the types are
                //wrong for copypaste of object, so narrow to actual type
                if (!copyPaste.getObject().getClass().getName().equals(parms[1])) {
                        Method[] _methods = aClassHelper.getDeclaredMethods();
                        int i = 0;
                        boolean found = false;
                        for (i = 0; i< _methods.length;i++) {
                                if (_methods[i].getName().equals("narrow")) {
                                        found = true;
                                        break;
                                }
                        }
                        if (found) {
                                Object[] _args = new Object[1];
                                _args[0] = copyPaste.getObject();
                                Object obj = _methods[i].invoke(aClassHelper,
                                                        _args);
                                args[1] = obj; //over write the args from above
                        }

} if (m != null) {
                        Object obj = m.invoke(aClassHelper,
                                args);
                        any = org.omg.CORBA.Any) args[0];
                }
        return any;
```

JAVA CODE TO INSERT ANY

*FIG. 17*

METHOD AND SYSTEM TO DISPLAY, MODIFY OR SUBSTITUTE THE CONTENTS OF SELF-DESCRIBING OBJECTS

BACKGROUND OF THE INVENTION

1. Technical Field

The present invention relates generally to an improved data processing system and in particular to a method and an apparatus for processing self-describing objects. Still more particularly, the present invention provides a method to decompose, display, and modify self-describing objects and to create new self-describing objects through cut and paste operations.

2. Description of the Related Art

Two recent trends in computing have been the development of distributed computing systems and the implementation of software using an object-oriented paradigm. Distributed computing systems are based on a client-server model. For any particular transaction, the client requests that a server perform a particular service, such as looking up or modifying a data value. In a distributed environment, the same machine may be a client for some requests and a server responding to other requests. The implementation of the client-server model is most easily accomplished using an object-oriented approach. CORBA (Common Object Request Broker Architecture) was developed by the Object Management Group (OMG). This nonprofit consortium was formed in 1989 and has membership of over 500 software vendors, developers, and users. A major goal of OMC is to create standards that allow interoperability and portability of distributed object-oriented applications.

Some of the services provided by CORBA are directory and naming services to locate remote objects, persistent object services, and transaction services. A transaction is an operation or set of operations that must be performed atomically. There are two outcomes for a transaction: it is committed resulting in data values being changed if appropriate or it is aborted, which means data values must be restored to their pre-transaction values. CORBA provides these services in a language independent and platform independent manner.

There are alternatives to CORBA, but these approaches have limitations. Socket programming is efficient in a homogeneous programming environment but it is low level, it cannot handle complex types well, and it does not work well in a heterogeneous environment. Remote Procedure Calls (RPC) provide a function-oriented interface to socket level communications but do not overcome the limitations already cited. The Distributed Computing Environment (DCE) by Open Software Foundation (OSF) is an interesting approach but not widely accepted. The Distributed Component Object Model (DCOM) from Microsoft only targets Microsoft Windows environments. The Remote Method Invocation (RMI) of Java is very similar to CORBA in design but is Java dependent. Consequently, CORBA provides the services necessary for distributing computing in the most language independent and machine independent manner.

CORBA is an object-oriented system so it interfaces easily with object-oriented languages such as C++ or Java. But non-object-oriented languages such as C or COBOL may also use CORBA. There are several components to the CORBA environment. The Object Request Broker (ORB) facilitates communications by finding remote objects and handling parameter values and return values for method invocation. The Interface Definition Language (IDL) specifies interfaces in a language independent fashion. The CORBA system maps these interfaces to the appropriate target programming languages. CORBA implements interface inheritance.

IDL supports many primitive data types, such as void, boolean, char, float, double, short, long, unsigned, and string. CORBA also supports a variety of constructed types such as enumerated, structure, union, interface, sequence, array, and exception. There is also an "ANY" type that can be used for parameters or return values. This will contain any combination of built-in types for IDL. ANY types carry along additional methods that help process the object. It would be advantageous to have a software package that allows a programmer to decompose, display, modify or substitute objects of type ANY, in the case of the CORBA environment, or, in general, for environments that contain self-describing types.

SUMMARY OF THE INVENTION

The present invention discloses a method and system to decompose, display, modify and substitute the contents of self-describing objects. A user-friendly graphical user interface is designed to facilitate the processing of these objects. Since objects can be arbitrarily complex, the presentation of information in a clear and concise manner is critically important. The user can modify the values for existing objects, and by using the copy and paste operations, the user can construct new objects. These changes are made through the graphical user interface where the contents of the object is displayed and controls are provided to modify existing objects or to create new objects.

The particular embodiment of this invention deals with CORBA objects of type ANY. Objects of ANY type include a Helper class to support the insertion and extraction of information. This class is dynamically created and invoked to assist in obtaining the contents from the ANY type. There are also methods to help narrow the type of objects. By utilizing these self-describing features, the present embodiment of this invention allows a user to decompose, display, and modify CORBA objects of type ANY, and to construct new objects of CORBA type ANY.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a block diagram of a data processing system that may be implemented as a server in accordance with a preferred embodiment of the present invention;

FIG. 10 is Java source code illustrating the extract of data from an ANY type in accordance with a preferred embodiment of the present invention;

FIG. 12 is Java source code illustrating the extraction of data from a complex type in accordance with a preferred embodiment of the present invention;

FIG. 13 is a flowchart illustrating the insertion of primitive data into an ANY type in accordance with a preferred embodiment of the present invention;

FIG. 14 is Java source code illustrating the insertion of primitive data into an ANY type in accordance with a preferred embodiment of the present invention;

FIG. 17 is Java source code illustrating the insertion of complex data into an ANY type in accordance with a preferred embodiment of the present invention.

DETAILED DESCRIPTION OF THE PREFERRED EMBODIMENT

Figure 1:
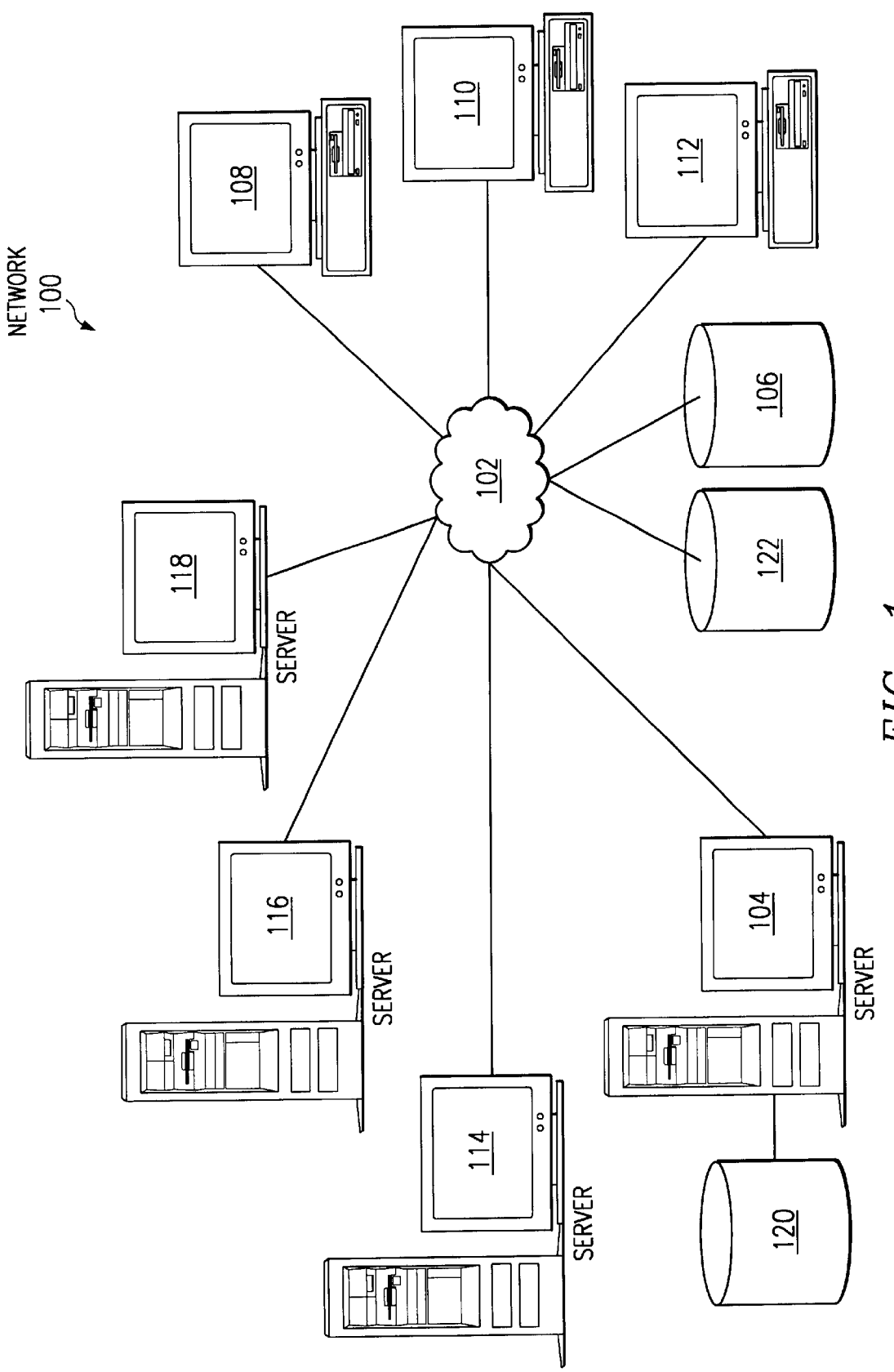
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, clients 108, 110 and 112 are also connected to network 102. These three clients may be, for example, personal computers or network computers. For purposes of this application, a network computer is any computer coupled to a network, which receives a program or other application from another computer coupled to the network. Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, data backup support is provided by storage units 106 and 122 for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention. For example, this invention can work on a standalone machine where both the client application and the server both reside.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system.

Figure 3:
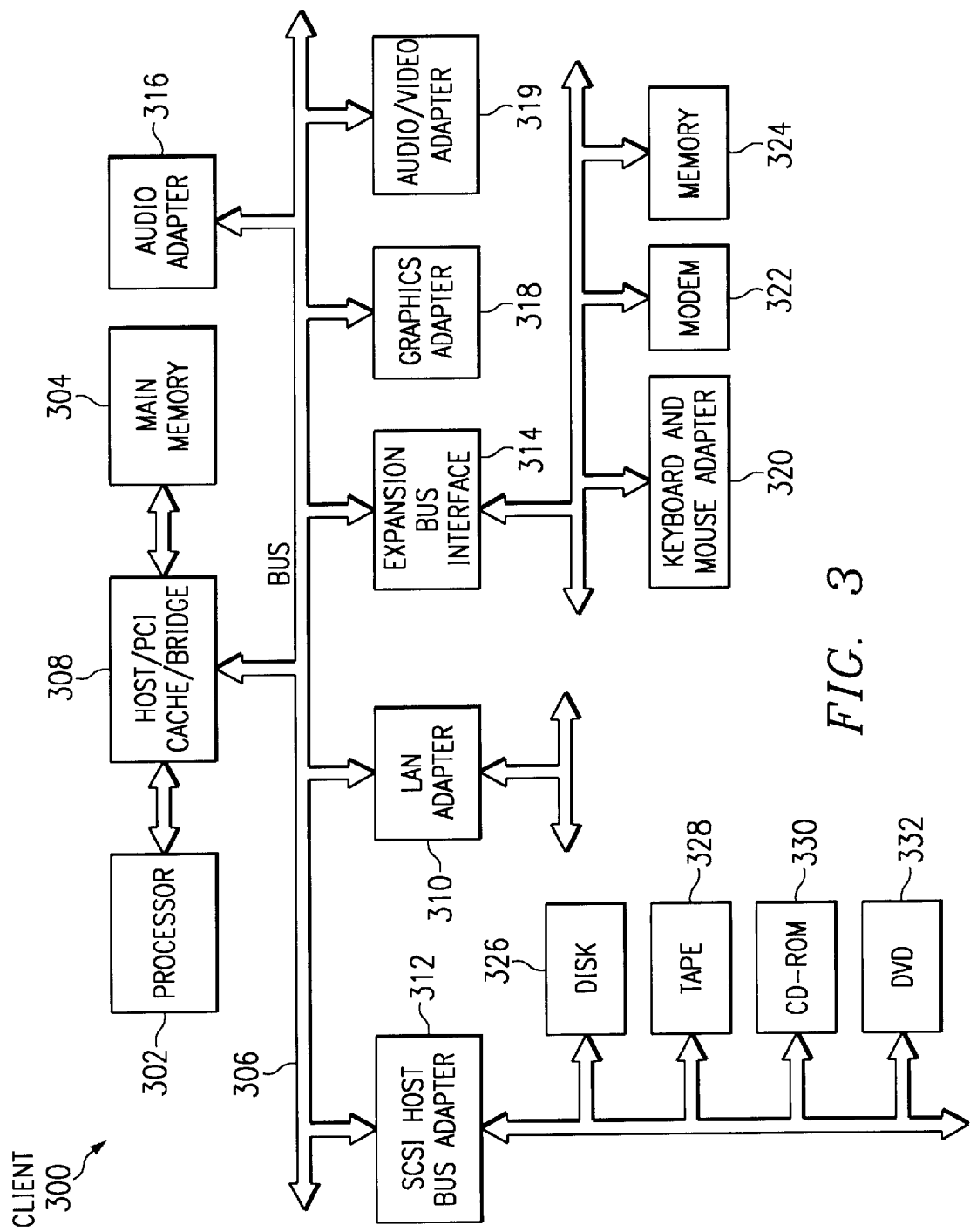
FIG. 3 is a block diagram of a data processing system that may be implemented as a client in accordance with a preferred embodiment of the present invention.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems. CORBA is a machine independent distributed software system that resides on a client-server network as depicted in FIGS. 1–3.

With reference now to FIG. 4 through FIG. 8, a sequence of screen images illustrate the manipulation of objects with CORBA type ANY in accordance with a preferred embodiment of the present invention. This display of functionality will help in understanding the underlying software implementation. Care has been taken to create a user-friendly display of the underlying data types. IDL primitive types (e.g., numeric types) are displayed in a text field that can be edited. Only valid entry is allowed, such as characters 0–9 for numeric data. If a numeric type is changed to "string", then entry of all alphanumeric characters, punctuation, etc., would be allowed. Enumeration types are displayed as drop down list boxes of all possible values with the current value being checked. A boolean is a single check box where unchecked represents false and checked represents true. Arrays or sequences are displayed in "tree" form with nodes and leaves displayed in a manner similar to the format found in Windows Explorer present in Windows 95/98/NT, a product of Microsoft Corporation.

Figure 4:
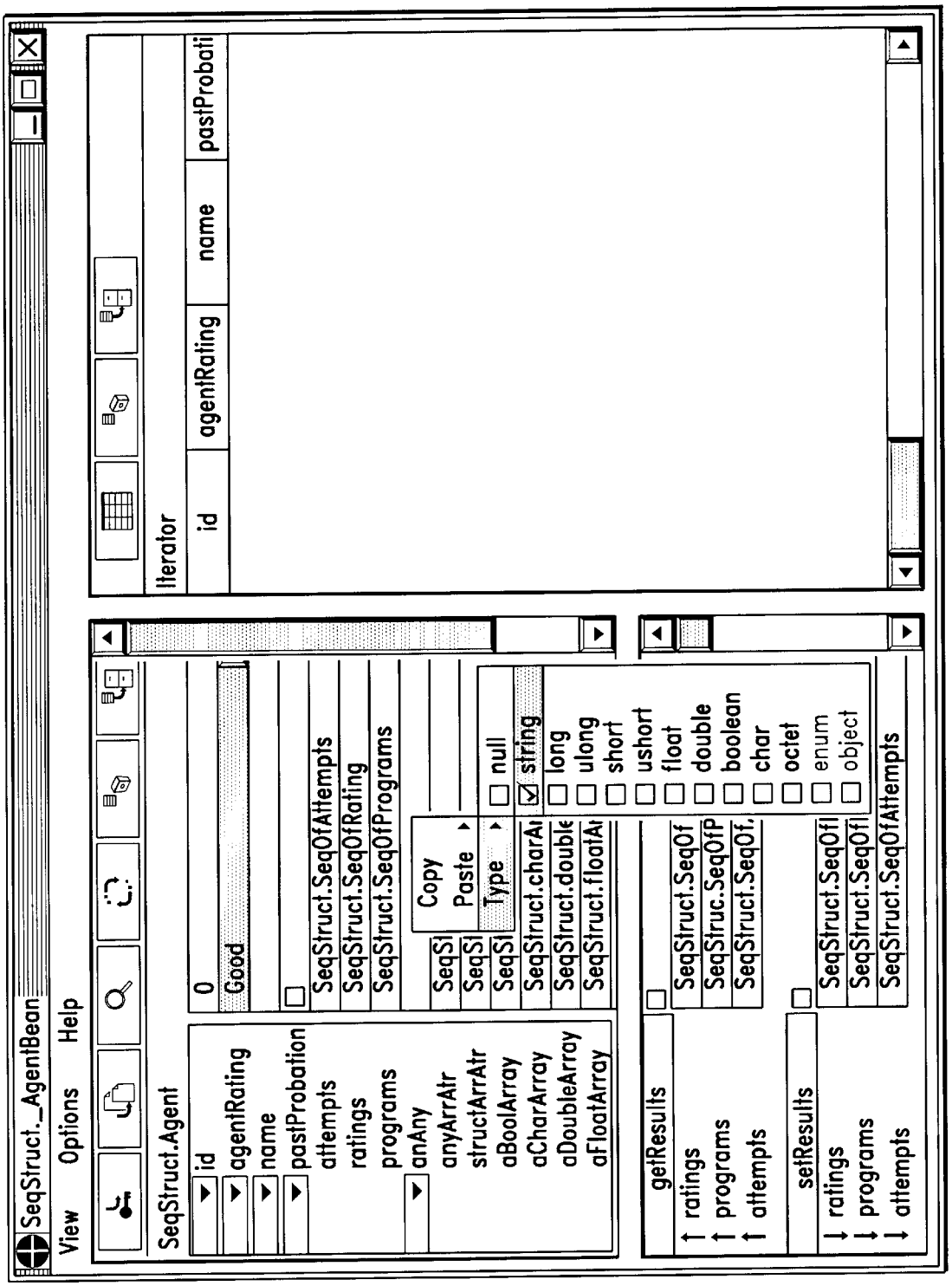
FIG. 4 is a screen image showing the Type options for an ANY object in accordance with the preferred embodiment of the present invention.

With reference now to FIG. 4, a screen image illustrates available options for an object of type ANY. A click of the right mouse button on "anAny" will display three options: Copy, Paste, and Type. Copy will transfer the contents of the data representation within the ANY component into the system clipboard. Paste will take an object that is currently contained in the system clipboard and change the current data representation to the data contained in the clipboard. The visual display will be updated accordingly. Type will modify both the visual display and the data representation to the type selected. The available types are: null, string, long, ulong (unsigned long), short, ushort (unsigned short), float, double, boolean, char, octet. No conversion takes place when the type is modified. The contents of the display are cleared when the new type is created. Data entry validation of numeric values is performed when the type is a numeric type. The validation includes range testing and acceptable character input. The screen image shows the submenu under the Type option.

Figure 5:
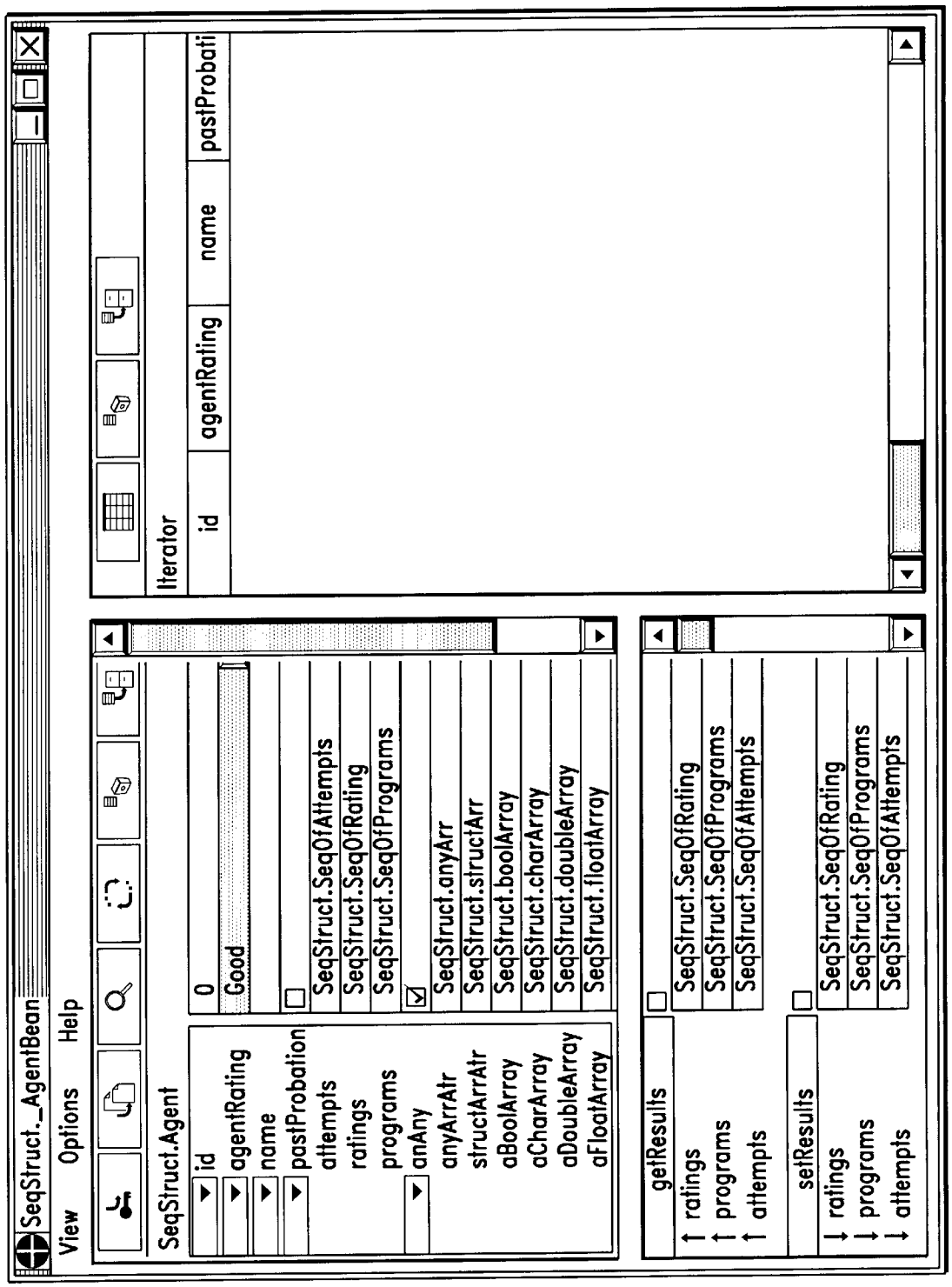
FIG. 5 is a screen image showing how a type can be changed to boolean in accordance with the preferred embodiment of the present invention.

With reference now to FIG. 5, a screen image shows the change of Type to boolean. Note that a boolean type is displayed as a checkbox and the value true is indicated by the checkmark in the checkbox.

Figure 6:
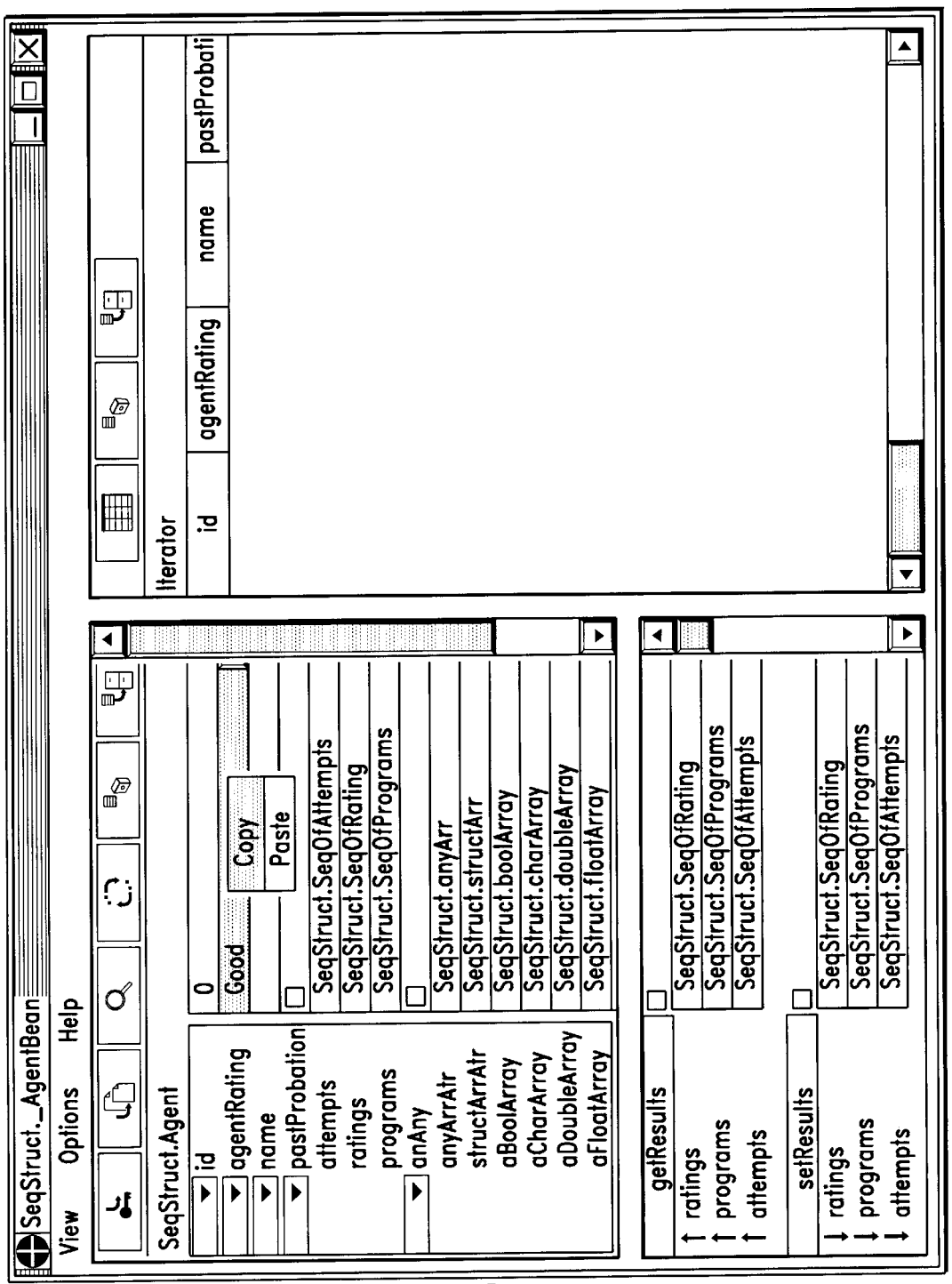
FIG. 6 is a screen image showing how to copy an object to the clipboard in accordance with the preferred embodiment of the present invention.

In FIG. 4 the drop down list of Type options did not include the enum option since the values of an enumeration type are user-defined. For this case, the copy and paste operations need to be used. In this example, which encompass screen images in FIG. 6 through FIG. 8, the object is called agentRating with the enumeration values of Good, Bad, and NeedsImprovement. FIG. 6 shows the selection of the Copy option that transfers the object to the system clipboard.

Figure 7:
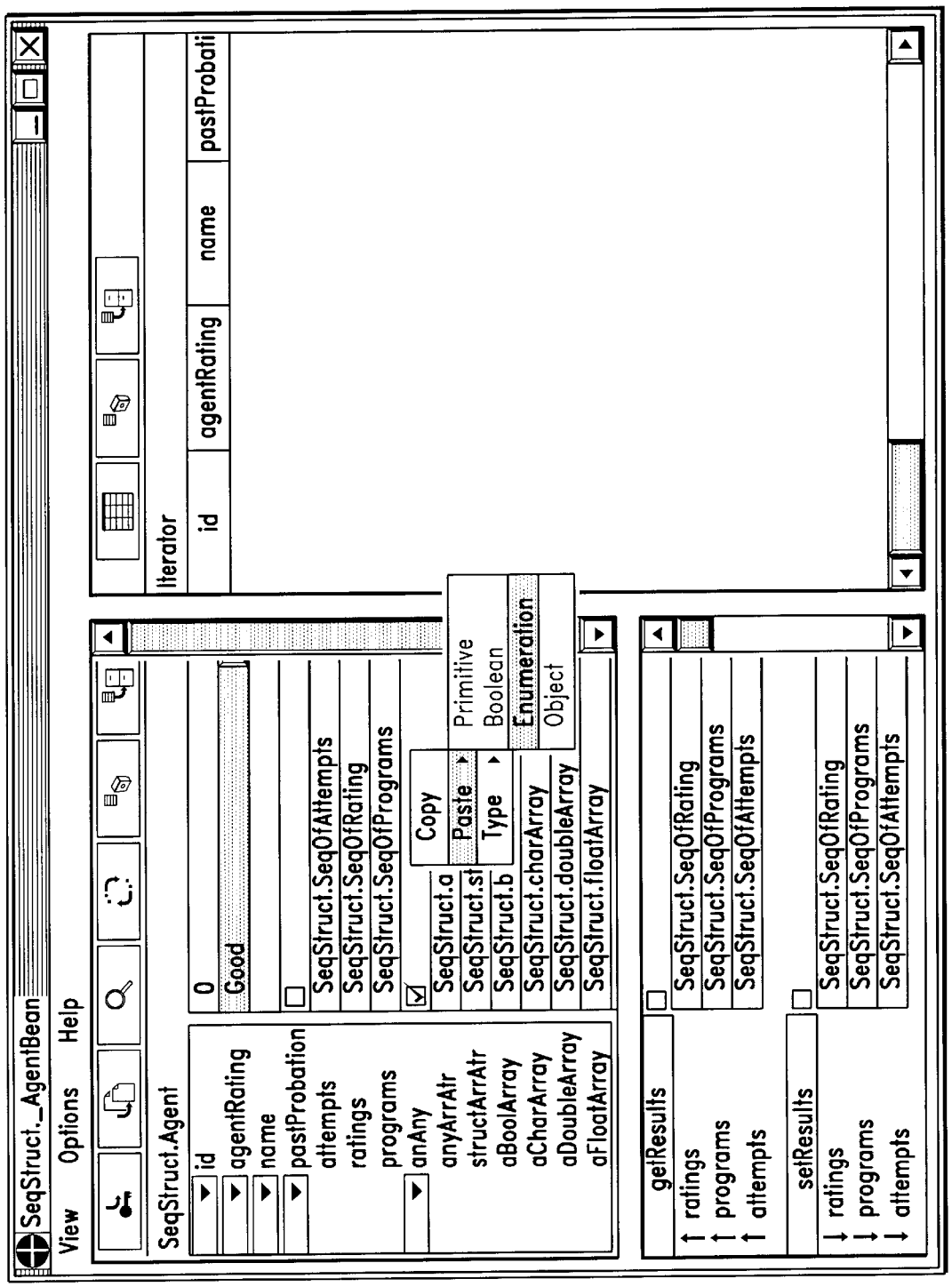
FIG. 7 is a screen image showing how to paste an object from the clipboard in accordance with the preferred embodiment of the present invention.

With reference now to FIG. 7, a paste operation to an object with type ANY in accordance with a preferred embodiment of the present invention is illustrated. A click of the right mouse button on "anAny" produces the three options noted before: Copy, Paste, and Type. In this case, Paste is selected and a submenu with four choices appears: Primitive, Boolean, Enumeration and Object. In this particular case, the option enumeration is selected. Each of these options is explained in detail in the paragraphs below.

A primitive CORBA type is null, string, long, ulong (unsigned long), short, ushort (unsigned short), float, double, char, octet. Each of these components will display as text entry fields with editing capabilities appropriate for the datatype. Also, the contents of the Copy component are preserved during the Paste. For example, if the "name" attribute component contained the value "Hello World" and that component is copied to the system clipboard and subsequently pasted into the ANY component, not only would the ANY component now support character string input but it would be initialized with the value "Hello World". Pasting a boolean component results with the ANY component display of a checkbox with the state initialized to the current state the Copy component, either true (checked) or false (unchecked).

Pasting an enumeration component results in the display becoming a drop down list box with the initially selected item being that item which was selected in the originating Copy component. The list box will contain the possible items that are applicable for this user defined data type.

Pasting a Corba object results in the display depicting that CORBA object with the name of that CORBA object. The CORBA object may be any complex object such as an array, sequence, structure, etc.

Figure 8:
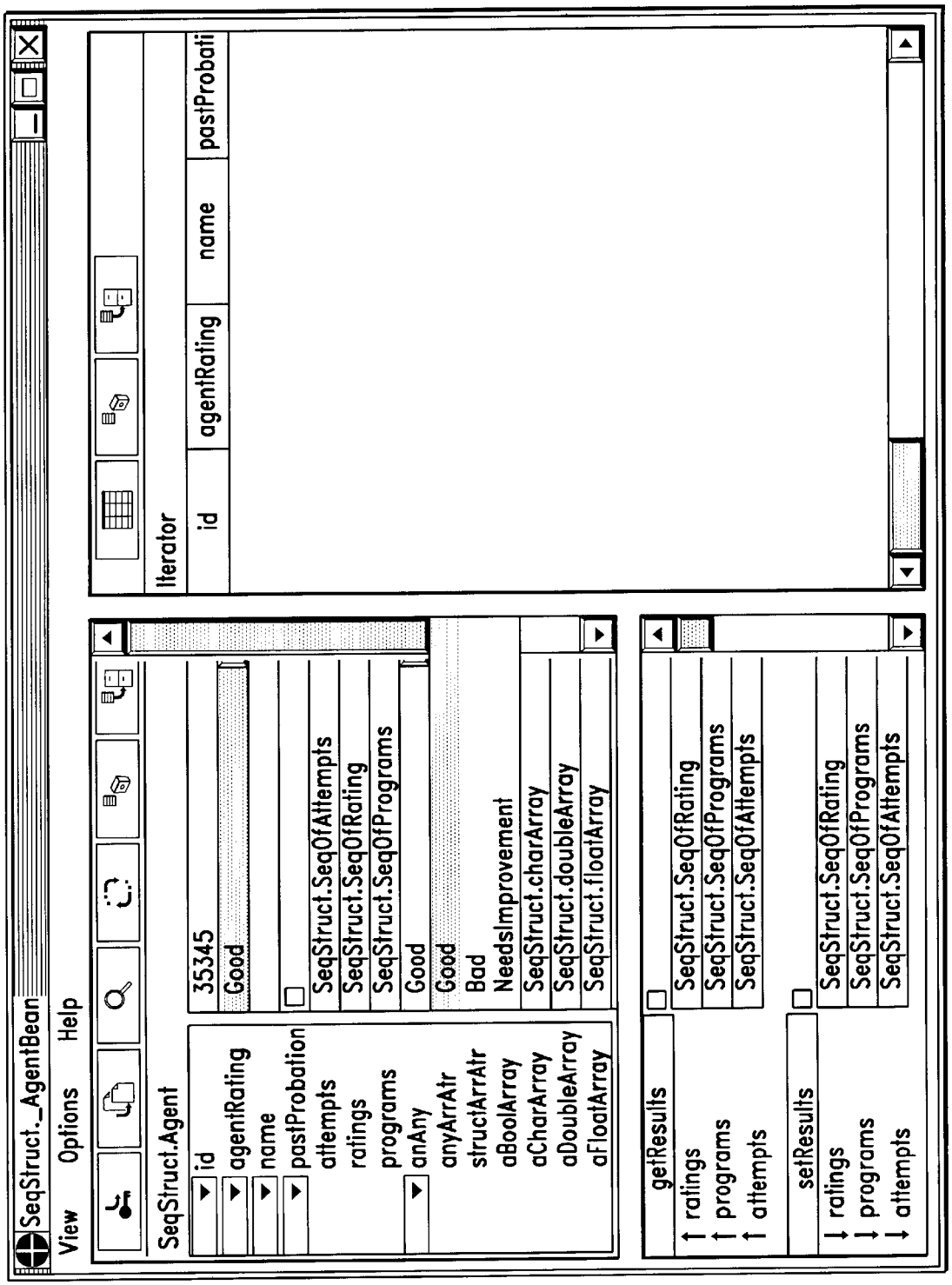
FIG. 8 is a screen image of an ANY object after the paste is completed in accordance with the preferred embodiment of the present invention.

FIG. 8 is a screen image showing the result of the paste operation on the original enumeration type agentRating. The "anAny" object has three possible values, Good, Bad, and NeedsImprovement, with the current value get to "Good", the value at the time of the copy of agentRating. Of course, the value of the anAny object can be changed to any of the other allowed values.

Although the snapshots in FIG. 4 through FIG. 8 are based on a Java implementation in accordance with a preferred embodiment of the present invention, this invention could be implemented in a variety of programming environments where objects are able to describe themselves, called reflection in Java.

The ANY component implementation is part of the Quick-Test system implemented in Java. There are three major components of this system. QTAnyField is responsible for the visual presentation and extracting/inserting the data values from/to the CORBA ANY object. QTAnyEditor is responsible for the popup menu processing and invoking the appropriate methods within the QTAnyField for data type conversion. QTAnyTableCellEditor is responsible for the presentation of the QTAnyField when the component is contained within a Table or Spreadsheet type object.

In the preferred embodiment of the invention, QTAnyField is a subclass of the Java Swing component named JPanel. This is a container for components based on the content of the ANY type. Various visual components will be added/removed to change the screen presentation seen by the user. By inspecting the typecode and contents of the CORBA ANY object, the components are added to the QTAnyField object and the display values are initialized. Once the new visual component is instantiated, it is added to the JPanel container and renders itself. The first step of this process is the extracting of data from the CORBA ANY object.

Figure 9:
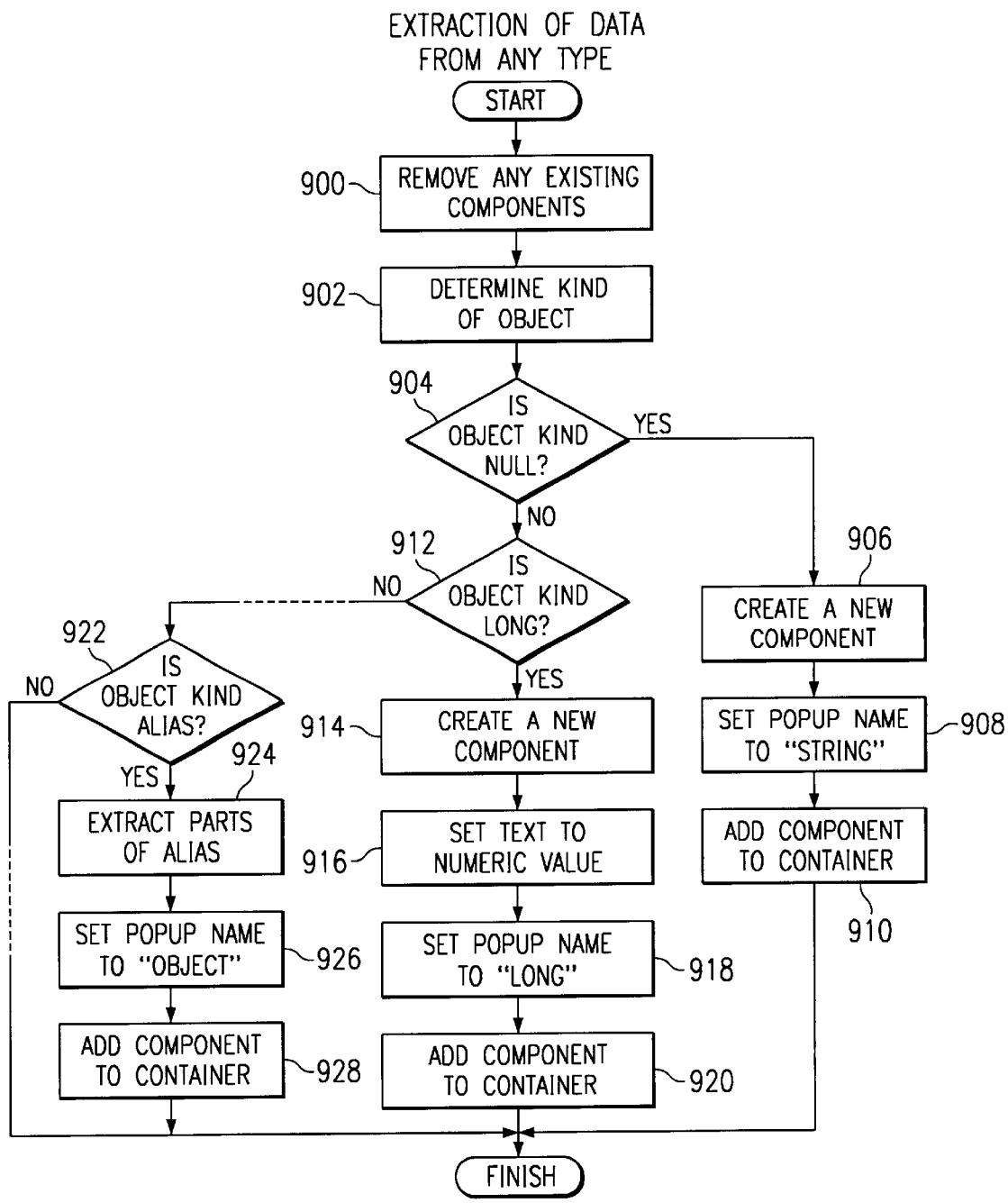
FIG. 9 is a flowchart illustrating the extraction of data from an ANY type in accordance with a preferred embodiment of the present invention.

Referring now to FIG. 9, a flowchart of the process of extracting data from an ANY type is depicted in accordance with the present invention. Any existing components are removed (step 900). The kind of object is determined based on the CORBA typecode (step 902). Each of the possible types, ranging from primitive types to complex types, is checked sequentially and when a match is found, the corresponding component is built. FIG. 9 illustrates two primitive types (null, long) and one complex type (alias). If the object kind equals null (step 904) then a new component is instantiated (step 906), the name for the popup menu is set to "string" (step 908), and this component is added to the JPanel container (step 910). If the object kind was not null, then next check is for object kind of long (step 912). If the object is of kind long, then a new component is instantiated (step 914), the text display of the component value is set to the value of the long integer (step 916), the name for the popup menu is set to "long" (step 918), and this component is added to the JPanel container (step 920). Checking for other kinds and creating corresponding components for the JPanel proceeds in a similar manner. One of the more complex object kinds is alias, which is detected at step 922. A separate routine (step 924) extracts the parts from the alias. This routine is explained in detail in FIG. 11 and FIG. 12 below. The menu choice for "object" is added to the display (step 926) and the component is added to the JPanel container (step 928). Those of ordinary skill in the art will appreciate that other simple and complex types are handled in a manner similar to that described for null, long, and alias.

The Java code taken from a preferred embodiment of the present invention is given in FIG. 10. Its logical structure follows the flowchart described above in FIG. 9. The parameter inAny is of type org.omg.CORBA.Any. The methods inAny.type( ).kind( ) extracts the kind for the CORBA object inAny. The constructor QTTextField creates the new component. The operation "set" on qtAnyEditor adds the name of the object to the menu. The operation "add" places a component in a container.

Figure 11:
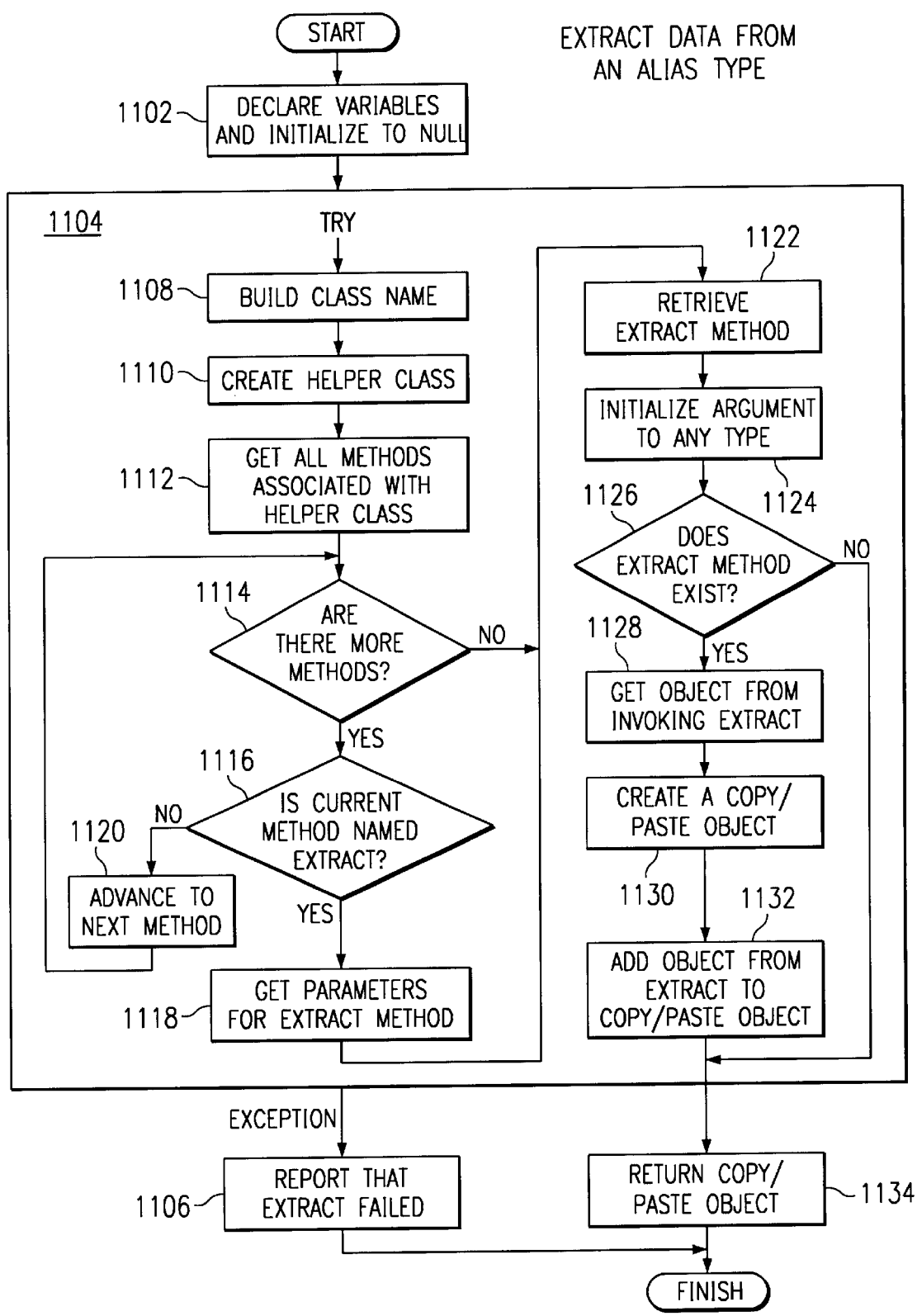
FIG. 11 is a flowchart illustrating the extraction of data from a complex type in accordance with a preferred embodiment of the present invention.

Referring to FIG. 11, a flowchart of the process of extracting data from an ANY type and building a CopyPaste object is depicted in accordance with the present invention. Each user-defined object in CORBA has a Helper class to support the insertion/extraction of ANY. This class is dynamically created and invoked to assist in obtaining the contents from the ANY. The CopyPaste object in this instance will contain the actual data and the user is presented an object that supports the CopyPaste behavior. Initially the variables used in the extract process are declared and set to null (step 1102). Since this process is dependent on extracting the Helper classes from the CORBA object and this process may fail, an exception block and handler (called "try" blocks with "catch" alternatives in both Java and C++) is needed (step 1104). In case of an exception, a failure to extract the alias object is reported (step 1106).

The helper class name is a string that needs to be constructed in a uniform manner (step 1108). The helper class is then created (step 1110) and all methods associated with the class obtained (step 1112). The method with the name "extract" needs to be found, if present. This is accomplished by sequentially searching the list of methods one-by-one. As long as there are more methods to be searched (step 1114) in the array of methods, the current method is checked to see if the name is "extract" (step 1116). If so, the parameters are obtained for the method (step 1118) and the search process is stopped. If the current method is not named extract, the search advances to the next method (step 1120) and control returns to decision 1114. If there are no more methods to check (in other words, the search has failed), control is transferred to step 1122.

In step 1122 the extract method is retrieved if it is present (if not, the result of retrieval is null). The ANY parameter passed into the extract procedure is put into an array of arguments (step 1124). If the extract method does not exist (step 1126), then the remainder of the TRY block is skipped. Assuming the extract method does exist, it is invoked (step 1128) to obtain the actual data from the CORBA object. A new CopyPaste object is created in the qtAnyEditor routine (step 1130). The extracted CORBA object is added to the CopyPaste component (step 1132). The extract process completes by returning the CopyPaste object (step 1134).

The Java code taken from a preferred embodiment of the present invention is given in FIG. 12. Its logical structure follows the flowchart described above in FIG. 11. The helper class needs a unique name that is formed in the following manner: the first four characters of the class name are removed, the last four characters of the class name are removed, then the string "Helper" is appended on the end of the resulting string. Additionally, any '/' characters are replaced with '.' characters. For example, consider the name "IDL:SeqStruct/SeqOfAttempts:1.0"; this name conforms to the IDL naming convention. The first step removes the "IDL:" prefix. The next step removes the ":1.0" suffix. The '/' after SeqStruct is changed to '.' and the suffix Helper is added to produce "SeqStruct.SeqOfAttemptsHelper". The Java method "forName" returns the class object associated with the specified string name.

The Java method "getDeclaredMethods" returns an array of all methods associated with a class. This list is searched until a method named "extract" is found. The Java method "getDeclaredMethod" retrieves the extract method itself. The Class Method named "invoke" actually calls the specified method (in this case, the extract method). Once the information is extracted from the CORBA object it is added to the CopyPaste object so that it will exhibit the desired copy and paste behavior shown in FIGS. 6–8.

Referring to FIG. 13, a flowchart of the process of inserting data into an ANY type is depicted in accordance with the present invention. An empty ANY object is created (step 1300). Next, the currently displayed visual component is found (step 1302). The type of the displayed component is then determined (step 1304). Each of the possible types, ranging from primitive types to complex types, is checked sequentially and when a match is found, the corresponding component is inserted into the ANY object. FIG. 13 illustrates two primitive types: string and long. If the object type equals string (step 1306) then the value of the string is retrieved (step 1308), and the string is inserted into the ANY type (step 1310). If the object type was not string, then next check is for object type of long (step 1312). If the object is of type long, then the integer value is retrieved (step 1314), and this long integer is inserted into the ANY type (step 1316). Checking for other types and inserting corresponding components into the ANY type proceeds in a similar manner.

The Java code taken from a preferred embodiment of the present invention is given in FIG. 14. Its logical structure follows the flowchart described above in FIG. 13. An empty object of type ANY is created first. The goal is to convert the textfield the user has selected into an ANY type CORBA object. After verifying the currently selected component is an instance of a QTTextField, the component is type cast to a local variable of the QTTestField. The type of the component is retrieved. A sequence of tests in a nested if command checks for type string, long, etc. The ANY object has corresponding methods to insert_string, insert_long, etc. Standard Java procedures for getText, getinteger, etc. retrieve the values to be inserted. Handling of primitive types such as these is very straightforward. The handling of complex types requires substantially more work.

Figure 15:
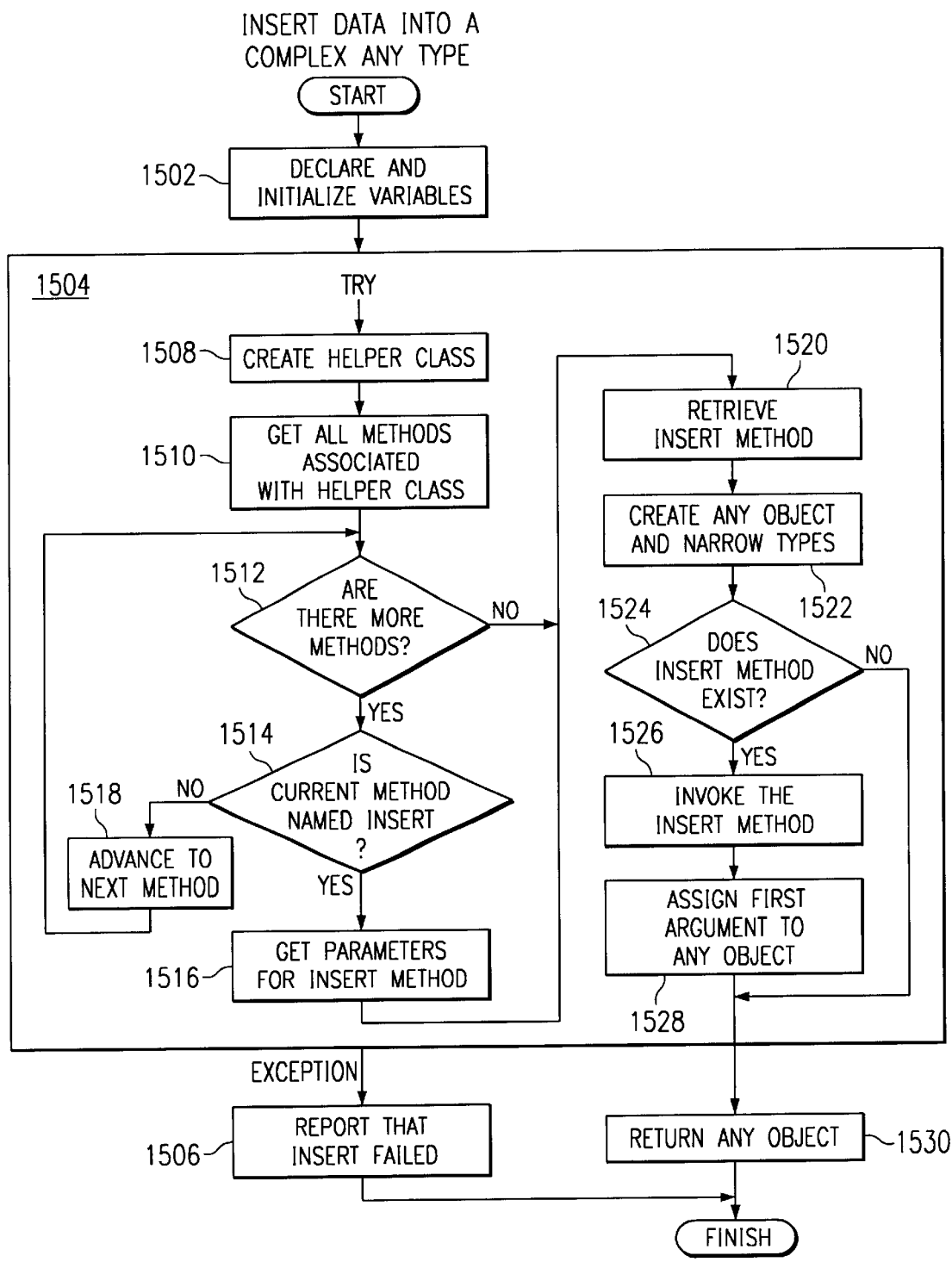
FIG. 15 is a flowchart illustrating the insertion of complex data into an ANY type in accordance with a preferred embodiment of the present invention.

Referring to FIG. 15, a flowchart of the process of inserting data from a complex CopyPaste object to a CORBA ANY type is depicted in accordance with the present invention. Each user-defined object in CORBA has a helper class generated to support the insertion/extraction of ANY. This class is dynamically created and invoked to assist in building the ANY object. The CopyPaste object contains the actual data and this must be inserted into the ANY object. Initially the variables used in the insert process are declared and initialized (step 1502). Since this process is dependent on inserting the helper classes from the CORBA object and this process may fail, an exception block and handler is needed (step 1504). In case of an exception, a failure to insert the complex object is reported (step 1506).

The helper class is created (step 1508) and all methods associated with the class obtained (step 1510). The method with the name. "insert" needs to be found, if present. This is accomplished by sequentially searching the list of methods one-by-one. As long as there are more methods to be searched (step 1512) in the array of methods, the current method is checked to see if the name is "insert" (step 1514). If so, the parameters are obtained for the method (step 1516) and the search process is stopped. If the current method is not named insert, the search advances to the next method (step 1518) and control returns to decision 1512. If there are no more methods to check (in other words, the search has failed), control is transferred to step 1520.

In step 1520 the insert method is retrieved if it is present (if not, the result will be null). The types in the parameter list are narrowed as necessary (step 1522). This is a complex step that is further refined in FIG. 16 below. If the insert method does not exist (step 1524), then the remainder of the TRY block is skipped. Assuming the insert method does exist, it is invoked (step 1526). The first argument value is assigned to the ANY object (step 1528) which is then returned (step 1530).

Figure 16:
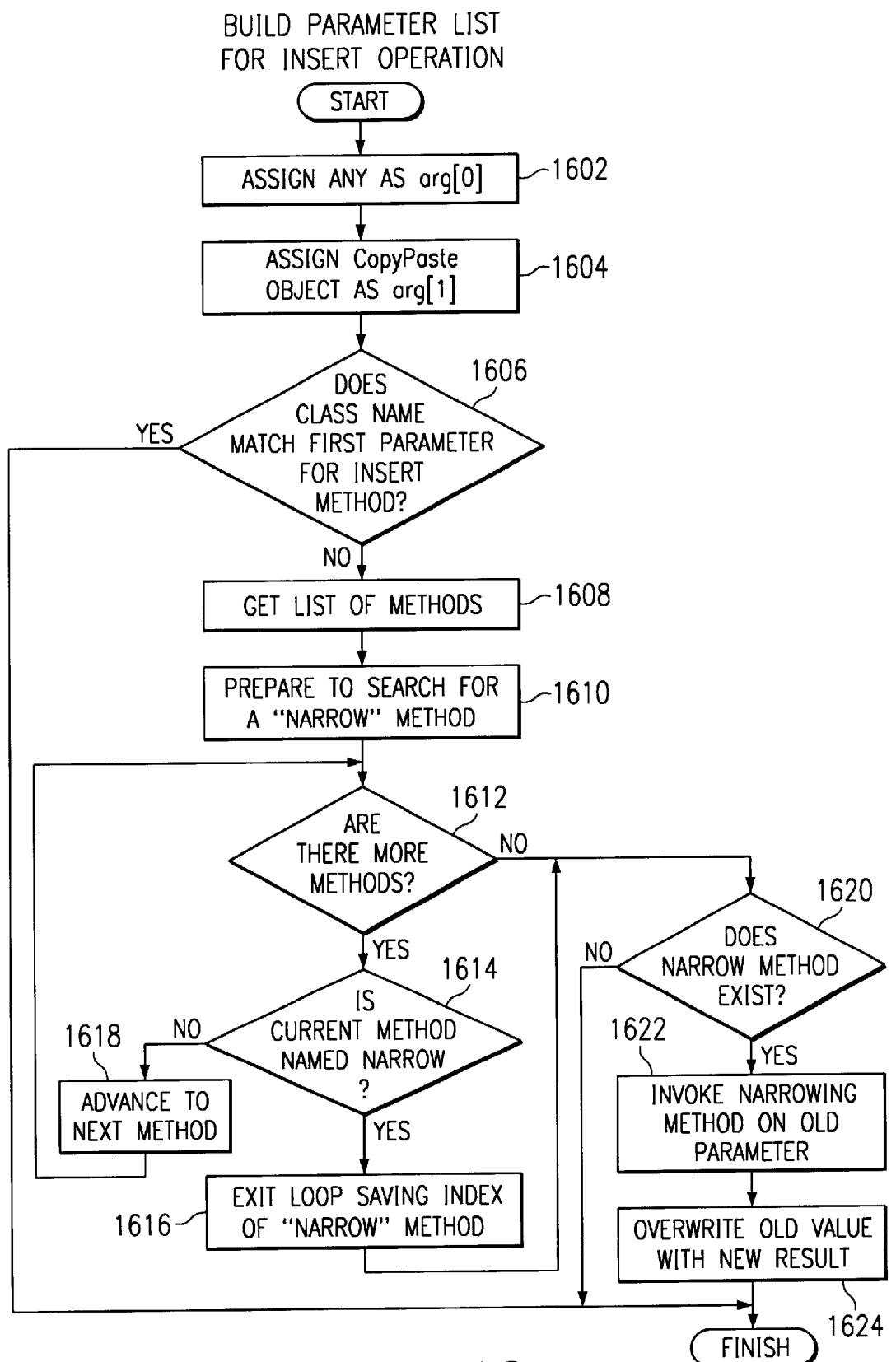
FIG. 16 is a flowchart illustrating the building of a parameter list for insertion of complex data into an ANY type in accordance with a preferred embodiment of the present invention.

Referring to FIG. 16, a flowchart of the process of narrowing the parameter types is depicted in accordance with the present invention. Initially two arguments are assigned: the ANY object (step 1602) and the CopyPaste object (step 1604). The latter parameters may be changed if they need to be narrowed, as described next. First, it is determined if the class name of the CopyPaste object is the same as the first parameter type in the list of parameters (step 1606). If they are equal, then no type narrowing is needed. If they are not equal, then the list of methods associated with the helper class needs to be searched to find a "narrow" method. First, the list of all methods is retrieved (step 1608). A Boolean flag indicated the "narrow" method has been found is set to false (step 1610). As long as there are more methods to be searched (step 1612) in the array of methods, the current method is checked to see if the name is "narrow" (step 1614). If so, the Boolean flag is set to true and exiting the loop prematurely saves the index where the narrow method was found (step 1616). If the current method is not named narrow, the search advances to the next method (step 1618) and control returns to decision 1612. If there are no more methods to check (in other words, the search has failed), control is transferred to step 1620.

If a narrowing method was not found (step 1620) this portion of the algorithm is finished. However, if a narrowing method is found, it is applied to the old parameter (step 1622). The result is then used to overwrite the old value (step 1624).

The Java code taken from a preferred embodiment of the present invention is given in FIG. 17. Its logical structure follows the flowcharts described above in FIG. 15 and FIG. 16. The helper class needs a unique name that is formed by appending the word "Helper" onto the CopyPaste name.

The Java method "getDeclaredMethods" returns an array of all methods associated with a class. This list is searched until a method named "insert" is found. The Java method "getDeclaredMethod" retrieves the insert method itself. It may be necessary to narrow the type in which case the methods are searched for a method named "narrow". If such a method is found, it is invoked to create a new object that overwrites the old type. The insert method that was found earlier is now used to put the data into a CORBA object of type ANY. Now the system has full copy and paste capability as previously described in FIGS. 6–8.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. For instance, the depiction of a multi-dimensional array could be represented using a tree component with each node of the tree containing some elementary or primitive data type. This entire visual component and associated data type, that is, array or sequence, could also be depicted in this embodiment. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method in an object-oriented environment for processing data stored in a self-describing software object, said software object including data and methods that are executable by said object-oriented environment, the method comprising the computer-implemented steps of:

identifying the contents of the self-describing object;

displaying the contents of the self-describing object in a graphical user interface;

displaying graphical controls, wherein the graphical controls are used to manipulate the contents of the self-describing object;

modifying the contents of the self-describing object in response to user input to graphical controls in the graphical user interface;

constructing a new self-describing object in response to user input to graphical controls in the graphical user interface; and wherein primitive types: null, string, long, ulong (unsigned long), short, ushort (unsigned short), float, double, char, and octet are displayed directly in text boxes in the graphical user interface.

2. A method in an object-oriented environment for processing data stored as a CORBA software object having an object type of "ANY", the object including data and methods that are executable by the object-oriented environment, the method comprising the computer-implemented steps of:

decomposing and displaying the contents of the CORBA ANY object in an easily understood form;

modifying the contents of the CORBA ANY object in an intuitive point-and-click environment;

constructing a new CORBA ANY object from other CORBA objects; and wherein primitive types:null, string, long, ulong (unsigned long), short, ushort (unsigned short), float, double, char, and octet are displayed directly with type-in capability to change values.

3. A data processing system including all object-oriented environment for manipulating a CORBA software object having an object type of "ANY", the object including data and methods that are executable by the object-oriented environment, the data processing system comprising:

a means for decomposing and displaying the contents of a CORBA ANY type in an easily understood form;

a means for modifying the contents of a CORBA ANY TYPE in an intuitive point-and-click environment;

a means for constructing a now CORBA ANY object from other CORBA objects; and wherein primitive types: null, string, long, ulong (unsigned long), short, ushort (unsigned short), float, double, char, and octet are (displayed directly with type-in capability to change values.

4. A computer program product on a computer-readable medium for use in a network workstation for processing CORBA objects of type ANY, the computer program product comprising:

instructions for decomposing the contents of a CORBA ANY object;

instructions for displaying the contents of a CORBA ANY object;

instructions for modifying the contents of a CORBA ANY object;

instructions for copying data from any allowed Interface Definition Language object to a CORBA ANY object;

instructions for pasting data from a CORBA ANY object to any allowed Interface Definition Language object;

wherein the data object that is processed may be primitive or complex; and wherein the primitive object is one of the following types: null, string, long, ulong (unsigned long), short, ushort (unsigned short), float, double, boolean, char, octet.

* * * * *

UNITED STATES PATENT AND TRADEMARK OFFICE
CERTIFICATE OF CORRECTION

PATENT NO. : 6,556,220 B1  Page 1 of 1
DATED : April 29, 2003
INVENTOR(S) : Hammond It is certified that error appears in the above-identified patent and that said Letters Patent is hereby corrected as shown below:

<u>Column 12,</u>
Line 27, after "are", delete "(displayed" and insert -- displayed --.

Signed and Sealed this

Sixteenth Day of September, 2003

JAMES E. ROGAN
*Director of the United States Patent and Trademark Office*